United States Patent [19]

Örtenheim

[11] Patent Number: 5,251,721
[45] Date of Patent: Oct. 12, 1993

[54] SEMI-HYBRID ELECTRIC AUTOMOBILE

[75] Inventor: Bjorn Å. Örtenheim, Stockholm, Sweden

[73] Assignee: Richard Ortenheim, Hovas, Sweden

[21] Appl. No.: 871,693

[22] Filed: Apr. 21, 1992

[51] Int. Cl.⁵ .............................................. B60K 5/10
[52] U.S. Cl. .................................... 180/298; 180/65.2
[58] Field of Search ............... 180/298, 65.2, 41, 89.1, 180/65.1, 65.3, 68.5, 294, 299; 290/4 R; 318/139

[56] References Cited

U.S. PATENT DOCUMENTS 4,217,970 8/1989 Chika .................................. 180/298
4,351,405 7/1982 Fields et al. ....................... 180/65.2
4,405,029 9/1983 Hart .................................... 180/65.2
4,697,660 10/1987 Wu et al. ............................ 180/65.2
4,890,859 1/1990 Drott .................................... 180/41
4,923,025 5/1990 Ellers .................................. 180/65.2

Primary Examiner—Richard M. Camby
Attorney, Agent, or Firm—Keck, Mahin & Cate

[57] ABSTRACT

A semi-hybrid electric automobile includes a compartment, adapted to receive an easily removable fuel propulsion unit therein, and a transmission, adapted to establish a torque-transmitting connection between an output shaft of a fuel propulsion unit, placed in a predetermined position in the compartment, and a drive axle of the automobile.

14 Claims, 3 Drawing Sheets

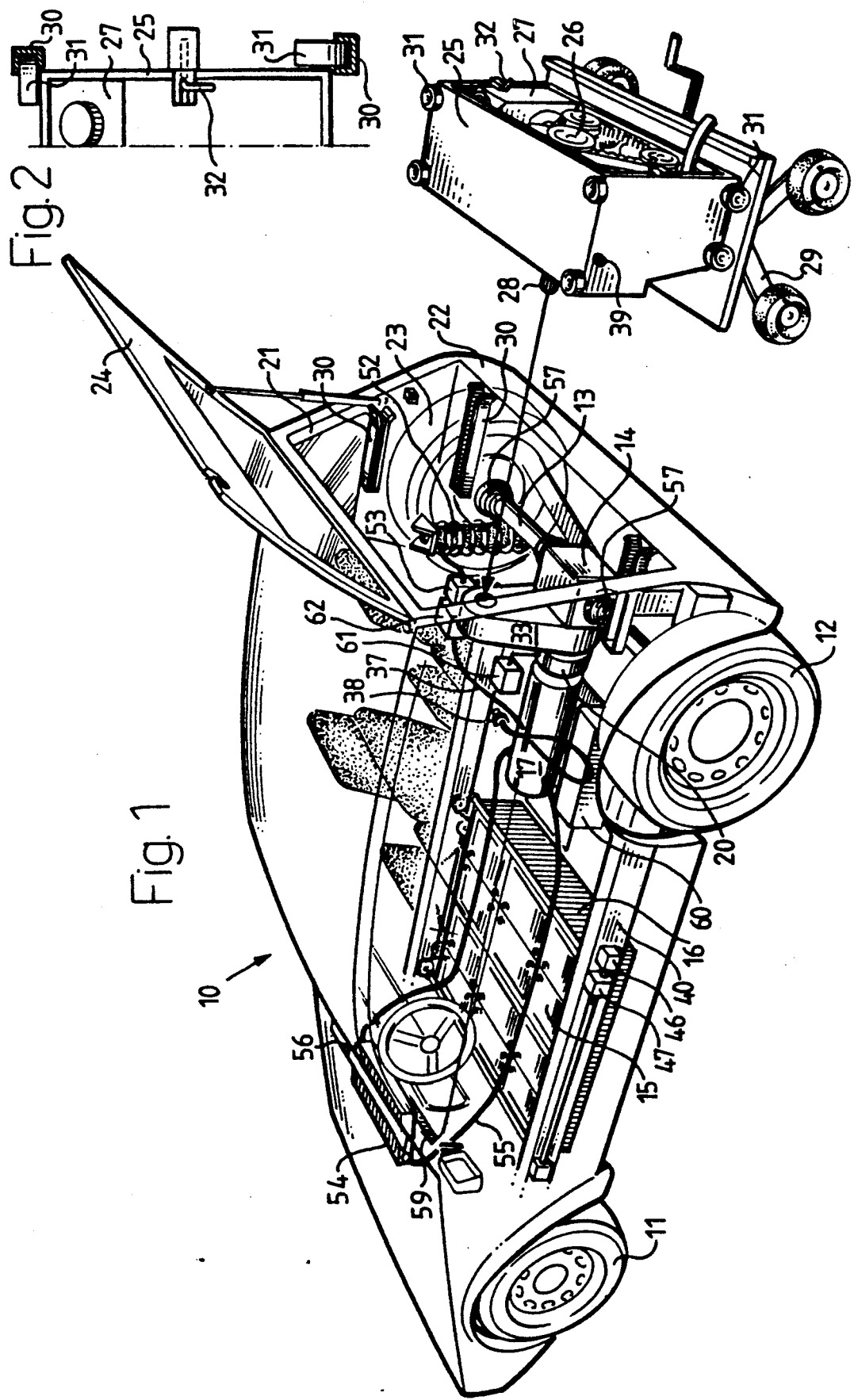

SEMI-HYBRID ELECTRIC AUTOMOBILE

BACKGROUND OF THE INVENTION

This invention relates to an automobile of the kind which is adapted for propulsion selectively either by electric power from an electric battery power source or by mechanical power from a fuel propulsion unit.

Automobiles relying on a set of electric batteries as the only source for their propulsion suffer from severe disadvantages, especially with respect to the limited maximum distance they may be driven without requiring recharging of the batteries or replacing them by another set of fully charged batteries.

Therefore, it has been proposed to provide an electrically powered automobile with a supplementary fuel propulsion system which may be used for delivering propulsion power when driving the automobile through nonurban regions where use of fuel propulsion systems is not prohibited by local regulations. However, if an automobile is permanently equipped with a battery-powered electric propulsion system as well as a fuel propulsion system, the total costs of both systems will be so high that it will be impossible to produce said automobile at reasonable costs acceptable to a substantial group of customers. Additionally, the fuel propulsion system will cause a very substantial increase of the total weight of the automobile, resulting in a considerable decrease of the already limited maximum distance which the automobile may be driven when utilizing the battery-powered electric propulsion system.

The present invention, therefore has for its object to provide an improved automobile of the kind initially specified which avoids the above drawbacks and possibly also at least some other drawbacks previously encountered in connection with such automobiles.

BRIEF SUMMARY OF THE INVENTION

In its broadest aspect, the invention seeks to provide an automobile which may easily be converted from electric propulsion to fuel propulsion without having to suffer from the drawbacks of unacceptably high costs for the production of the automobile itself and an unfavourable substantial permanent increase of the total weight of the automobile.

In a more specific aspect, the invention is directed to an automobile facilitating such a conversion of its propulsion by comprising a compartment, adapted to receive an easily removable fuel propulsion unit therein in a predetermined accurate position, and a transmission, adapted to establish a torque-transmitting connection between an output shaft of a fuel propulsion unit placed in said predetermined position in said compartment and a drive axle of the automobile.

Another object of the invention is to provide an improved fuel propulsion unit for use in an automobile of the kind initially specified. For this purpose, the invention provides a fuel propulsion unit formed as a separate mechanical power package which is adapted to be mounted so that it is easily removable in a predetermined accurate position in a specific compartment of said automobile and, when so mounted, to have an output shaft thereof provided in torque-transmitting connection with a drive axle of the automobile through a transmission, adapted to establish such a connection.

BRIEF DESCRIPTION OF THE DRAWINGS

The foregoing and various other objects, features and advantages of the invention will become more apparent from the following description and the appended claims. In said description, reference is made to the accompanying drawings wherein:

FIG. 1 is a diagrammatical perspective view, partially in phantom, of an automobile according to an embodiment of the invention, showing also a separate fuel propulsion unit supported in a lifted position on a transportation carriage and adapted for insertion into a rear compartment in the automobile;

FIG. 2 is a fragmentary elevational view, showing a portion of the fuel propulsion unit upon its insertion into said compartment and illustrating guide means and locking means for said unit;

DETAILED DESCRIPTION OF THE PREFERRED EMBODIMENT

Figure 3A:
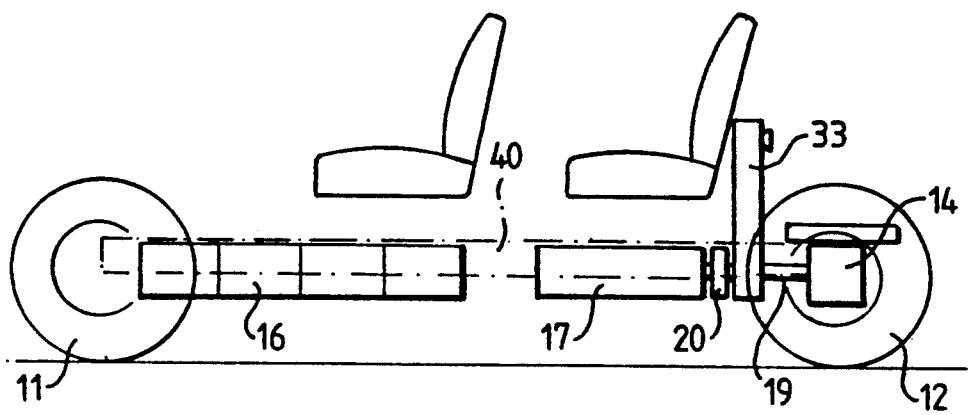
FIG. 3A, 3B and 3C are diagrammatical side elevational outlines illustrating the automobile in three different conditions.

In FIG. 1 there is shown an electric automobile 10 having two front wheels 11 and two rear wheels 12. Rear wheels 12 are mounted on a rear axle 13 which forms a drive axle of automobile 10 and which is provided with a central differential 14.

Figure 5:
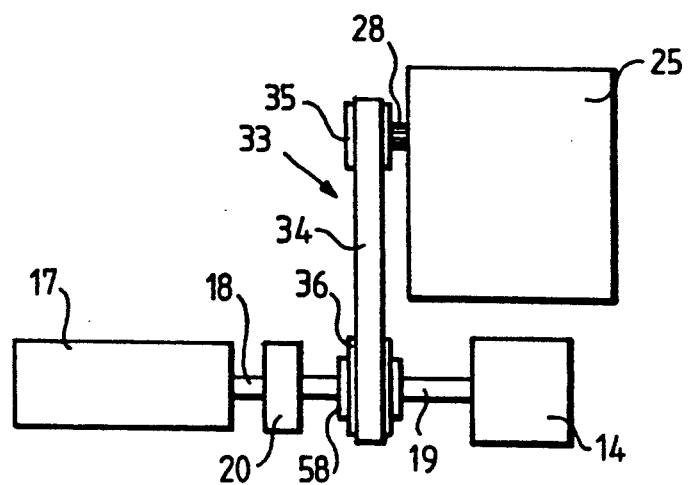
FIG. 5 is a diagrammatical partial side elevation view showing an electric driving motor, an electrically operated clutch, a belt transmission and some further details.

In order to permit propulsion of the automobile by electric power from a battery power source 15, comprising a set of electric batteries placed in a removable cassette box 16, an electric driving motor 17 is mounted centrally in front of differential 14. As may be seen from FIG. 5, motor 17 has an output shaft 18 which may be connected to the pinion shaft, or driving shaft, 19 of differential 14 through an electrically operated clutch 20. Hereby, motor 17 may deliver mechanical propulsion power to rear wheels 12 through differential 14 and rear axle 13.

The necessary electric circuitry for controlling the operation of motor 17 and clutch 20, which may be contained in boxes 60, 61 and 62, may be of any suitable and conventional kind and will therefore not be described here.

In a rear portion of automobile 10 and accessible through an opening 21 in the back of the car body 22, there is provided a compartment 23 which may be closed by means of a hinged door 24. When automobile 10 is used as an ordinary electric car, said compartment 23 may be used as a luggage compartment. However, in accordance with the invention, this compartment may also be used for another very specific purpose, namely for accommodating a fuel propulsion unit 25 which may be mounted easily removable in a predetermed accurate position in compartment 23 for use as an alternative propulsion power source in automobile 10.

Fuel propulsion unit 25 is formed as a self-contained power package which comprises an combustion engine 26, a fuel tank 27, and an automatic transmission (not shown) which connects engine 26 to an output shaft 28 of unit 25. In addition, unit 25 also contains its own electric battery (not shown) in order hereby to make it possible for said unit to operate independently of any electric power supply thereto from battery power source 15. Moreover, all additional equipment required for enabling engine 26 to operate in a manner similar to an ordinary internal combustion engine in an automobile may be provided within unit 25. Especially, an electric generator should be provided to maintain the battery of said unit in a continuously recharged state.

In FIG. 1 fuel propulsion unit 25 has been shown supported in a lifted position on a transportation carriage 29 which may be used for placing said unit in a position immediately in front of opening 21 to enable an easy insertion of unit 25 into compartment 23. In order to ensure that unit 25 will be placed in the predetermined accurate position in compartment 23, cooperating guide means are provided in compartment 23 and on unit 25. In the illustrated embodiment said guide means are formed by U-profile guide ways 30 in compartment 23 and guide rollers 31 on unit 25. As illustrated in FIG. 2, latch means 32 are also provided for locking unit 25 firmly and rapidly in position in compartment 23.

When inserting unit 25 into its intended position in compartment 23, the output shaft 28 of unit 25 is brought into connection with a transmission 33 which is adapted to transmit torque from output shaft 28 to pinion shaft 19 of differential 14. As diagrammatically shown in FIG. 5, transmission 33 may for instance consist of a belt transmission comprising an endless belt 34, preferably an indented V-belt, laid over a driving pulley 35 connected to shaft 28 through splines or other suitable means, and a driven pulley 36 mounted on shaft 19 and preferably connected to said shaft through an electrically operated disengageable clutch 58.

In order to make it possible to control the operation of combustion engine 26 of fuel propulsion unit 25 from various controls provided at or under the dashboard of automobile 10, such as an accelerator pedal, an ignition switch, etcetera, an electric multi-conductor cable 37 may be provided for establishing an electric connection between said controls and unit 25 by means of a connector 38 mounted at one end of cable 37, which has its other end connected to box 62, and a connector 39 mounted in a side wall of the casing of unit 25.

Figure 4:
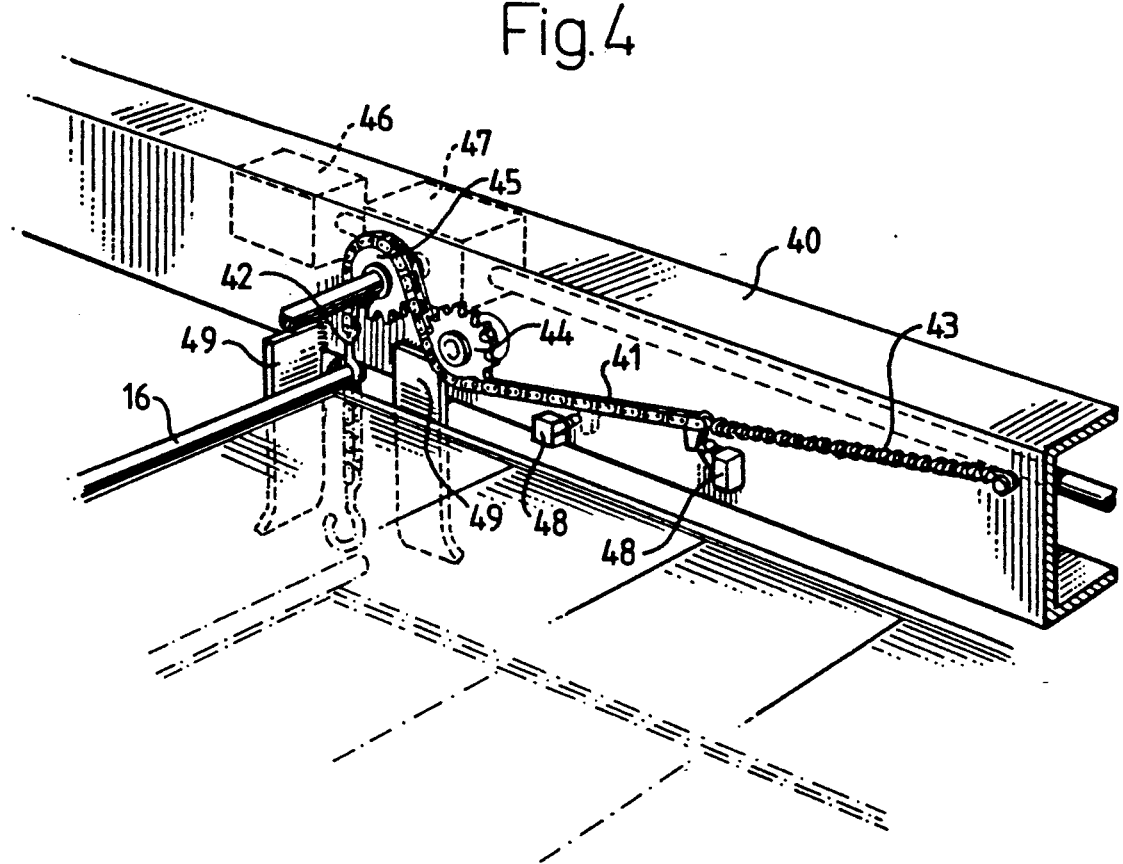
FIG. 4 is a perspective partial view showing portions of an equipment for lifting an electric battery cassette and holding it in a predetermined lifted position between longitudinally extending chassis frame members of the automobile.

FIG. 4 shows a portion of battery cassette 16 and a portion of an equipment by which said cassette may be lifted to and held in a predetermined position between a pair of longitudinally extending frame members 40 of automobile 10. Said equipment comprises a lifting chain 41 for each corner of the generally rectangular cassette 16. Said chain 41 is provided with a lifting hook 42 at its one end, while at its other end, it is connected to one end of a coiled spring 43 having its other end anchored to an adjacent frame member 40. Between its two ends, chain 41 extends below a first freely rotatable chain wheel 44 and over a second chain wheel 45 which may be driven from an electric motor 46 through a worm gear 47 to lift or lower battery cassette 16. Micro-switches 48 are provided as limit switches to interrupt the operation of motor 46 when cassette 16 has been lifted to its intended normal position or lowered to ground. Guide plates 49 serve to ensure proper positioning of cassette 16 between frame members 40.

The above arrangement makes it possible, whenever desired, to effect a rapid removal or replacement of battery cassette 16. Additionally, it also makes it possible to hold the battery cassette in a position where it is most unlikely that it may cause injury to the driver or a passenger in the case of an accident.

Figure 3B:
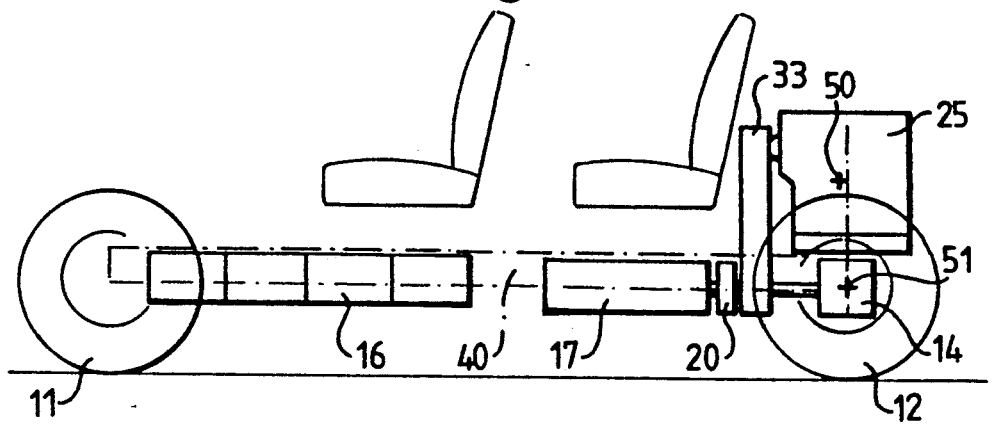
Figure 3C:
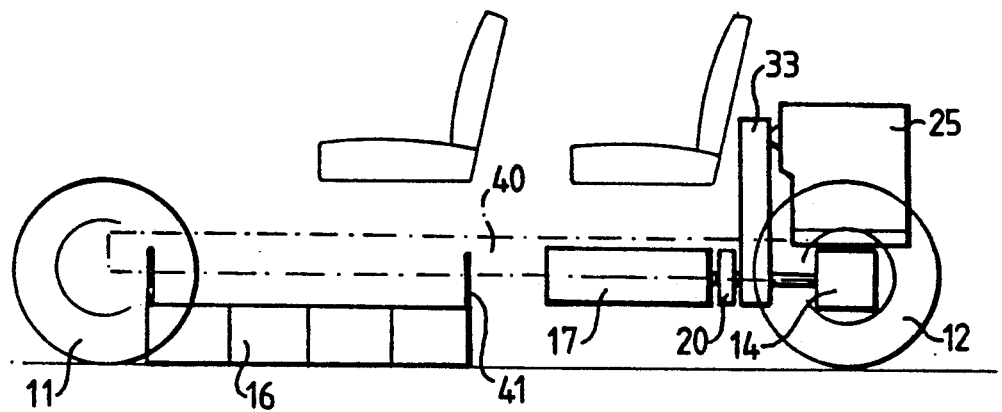

FIG. 3A, 3B and 3C illustrate automobile 10 in three different possible conditions.

In FIG. 3A automobile 10 is shown equipped so as to function as an ordinary pure electric car.

In FIG. 3B a fuel propulsion unit 25 has been mounted. Accordingly, automobile 10 may now function alternatively as an electric car or as a fuel propulsion car.

In FIG. 3C the battery cassette 16 has been removed. Automobile 10 may then function only as a fuel propulsion car.

As indicated in FIG. 3B, when mounted in automobile 10, fuel propulsion unit 25 should preferably have its resultant centre of gravity 50 located close to and preferably slightly in front of a vertical plane through the centre 51 of differential 14 and rear axle 13. However, even when so placed, the weight of unit 25 may require an adjustment of the horizontal level of automobile 10. Therefore, as shown in FIG. 1, pneumatic means 52, the internal pressure of which may be adjusted by means of an electrically operated air pump 53, are provided to permit an adjustment of the horizontal level of automobile 10 in response to the existing load.

In FIG. 1 electric driving motor 17 has been assumed to be provided with an outer liquid cooling jacket connected to a liquid cooling system comprising a radiator 54 placed in a front compartment in automobile 10 and connected to the water cooling jacket of motor 17 by means of flexible tubes 55. Said radiator 54 may receive fresh air from an air intake 56 located in front of the windshield of automobile 10 and discharge the air heated therein through any suitable outlet openings which preferably may include defroster openings 59 or other openings through which heated air may be delivered in a controllable manner to the interior of automobile 10.

In addition to the advantage of serving as a source for delivering heat to the passenger compartment in automobile 10, the liquid cooling system for electric motor 17 also offers the advantage of making it possible to overload motor 17 substantially, at least during restricted periods of time, for instance during acceleration periods. Hereby, the performance of automobile 10 may be substantially improved.

Although motor 17, clutch 20, transmission 33 and differential 14 may be mounted in a floating manner in relation to the chassis of automobile 10, they may preferably be firmly secured to the chassis. In this case universal joints will have to be incorporated in rear axle 13 as indicated at 57 in FIG. 1.

In order to make it possible to increase the maximum distance automobile 10 may be driven by electric power from battery power source 15 without requiring a stop for having the batteries recharged or replaced, a system for regeneration of electric energy during braking may be utilized. One such system is disclosed in my prior U.S. Pat. No. 4,152,633, hereby incorporated by reference.

A specific advantage of the automobile above described is that a customer does not have to buy a car provided with a fuel propulsion unit. Instead, he only needs to buy a car equipped with an electric propulsion system and constituting a semi-hybrid electric automobile. When he requires a fuel propulsion unit, he may rent such a unit from any suitable source offering such units for rent, such as a car dealer, a service station or a car hire service.

The invention is not restricted to the embodiment above described and shown in the drawings. Instead, many other embodiments are feasible within the scope of the invention.

I claim:

1. An automobile comprising:
   a compartment, adapted to receive an easily removable fuel propulsion unit therein in a predetermined accurate position,
   a transmission, adapted to establish a torque-transmitting connection between an output shaft of the fuel propulsion unit, when it is placed in said predetermined accurate position in said compartment, and a drive axle of the automobile, propulsion of said automobile being selectively provided by only one of electric power from an electric battery power source and mechanical power from a fuel propulsion unit, and
   guide means for guiding the fuel propulsion unit into said predetermined accurate position when propulsion of said automobile is to be provided by mechanical power.

2. An automobile according to claim 1, wherein said compartment is provided in a rear portion of the automobile and said drive axle is a rear axle of the automobile.

3. An automobile according to claim 1, wherein said transmission is adapted to establish a torque-transmitting connection between the output shaft of the fuel propulsion unit and said drive axle through a differential of said drive axle.

4. An automobile according to claim 3, wherein said transmission comprises a belt transmission, adapted to transmit torque from the output shaft of the fuel propulsion unit to a pinion shaft of said differential.

5. An automobile according to claim 3, comprising a single electric driving motor, adapted to be powered from said electric battery power source and connectable to the pinion shaft of said differential through an electrically operated clutch.

6. An automobile according to claim 5, wherein said electric driving motor is provided with liquid cooling means, connected to a liquid cooling system, for cooling said electric driving motor.

7. An automobile according to claim 6, wherein said liquid cooling system comprises means for delivering heat to the interior of the automobile.

8. An automobile according to claim 5, wherein said clutch is adapted to break the connection between said electric driving motor and the pinion shaft of said differential during propulsion of the automobile by mechanical power from said fuel propulsion unit.

9. An automobile according to claim 1, wherein said electric battery power source is formed by an easily removable and replaceable battery cassette.

10. An automobile according to claim 1, further comprising an electrically operated levelling system permitting an adjustment of the horizontal level of the automobile in response to its load.

11. An automobile according to claim 1, wherein said guide means is formed by guide ways in said compartment.

12. An automobile according to claim 11, wherein each of said guide ways has a U-profile.

13. An automobile according to claim 11, wherein said fuel propulsion unit includes rollers provided thereon which cooperate with said guide ways.

14. An automobile according to claim 1, and further comprising latch means for locking said fuel propulsion unit in said predetermined accurate position.

* * * * *